W. D. WILEY.
Grain-Tallies.
No. 166,442. Patented Aug. 3, 1875.
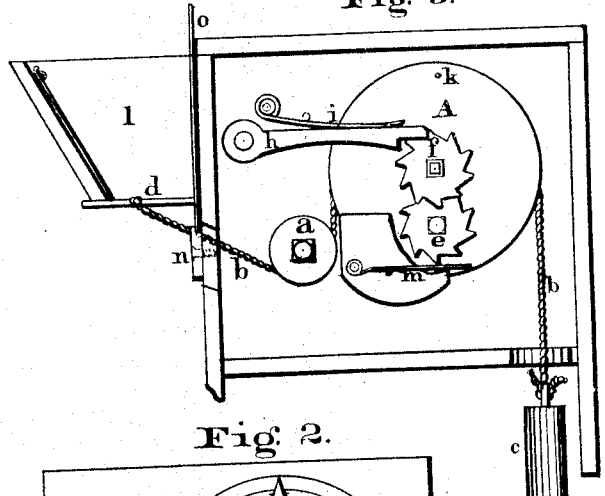
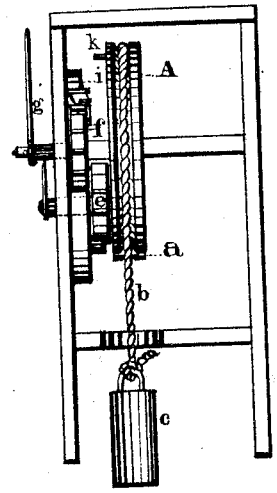
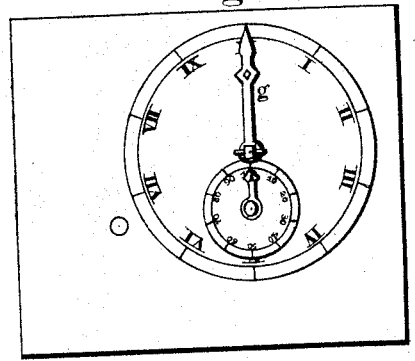
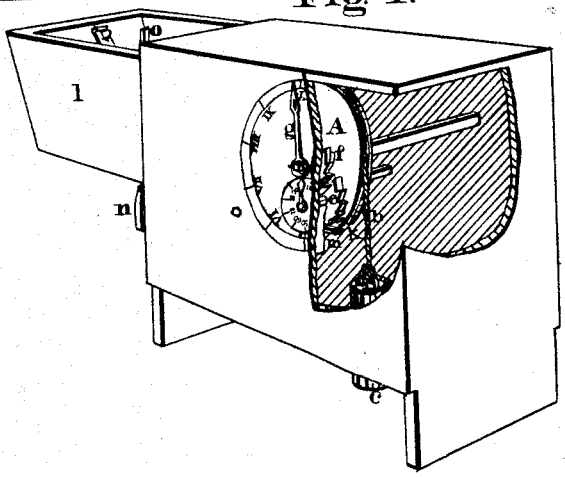
WITNESSES.
Argalus P. Hopkins.
Richard Powers
INVENTOR.
Watson D. Wiley

UNITED STATES PATENT OFFICE.

WATSON D. WILEY, OF OSWEGO, NEW YORK, ASSIGNOR OF ONE-HALF HIS RIGHT TO CHARLES H. WOODRUFF, OF SAME PLACE.

IMPROVEMENT IN GRAIN-TALLIES.

Specification forming part of Letters Patent No. 166,442, dated August 3, 1875; application filed February 5, 1875.

*To all whom it may concern:*

Be it known that I, WATSON D. WILEY, of Oswego city and county, State of New York, have invented a Draft-Indicator, of which the following is a specification:

The object of my invention is to indicate or keep the exact number of drafts made while weighing materials of any kind where count is kept by tally, or count, or draft, and where power is applicable to work the machine, but is more particularly designed for indicating the number of drafts while weighing grain in a weigh-hopper, and worked by the opening and shutting of the drop of the weigh-hopper.

The machine and its operations are illustrated by the different views of the accompanying drawing, in which—

Figure 1 is a perspective view, with part of the exterior removed; Fig. 3, an elevation view, showing the dial or indicator face, Fig. 2, removed; and Fig. 4, an end elevation of the same, with the outside case removed to show the relative position and arrangement of its different parts.

At A a are shown pulleys, over and under which the rope or heavy cord b, or its equivalent, passes, and connects at one end with the bottom of the drop d of the weigh-hopper l, and the other end is attached to the weight c. The grain is discharged from the hopper by letting fall the drop d, which, by the gravity of the weight c, sets in motion the ratchet-wheel f, to the end of whose pivot is attached the indicator-hand g. This hand moves forward, and one draft of grain is indicated on the large dial-face.

As the drop d is closed the pawl h, held to the ratchet-wheel f by the spring i, prevents the wheel f, which is attached to the pulley A, from rolling backward, the rope b slipping on the pulley A. This operation is repeated until the indicator-hand g passes round to the starting-point, at which point a pin, k, is so located on the pulley A as to strike the ratchet-wheel e, (which is moved forward one cog and then released,) which is shown on the lower dial of the indicator-face, indicating that ten drafts have passed through the hopper. The ratchet-wheel e is held stationary by the spring m until it is moved forward by the pin k at the next revolution of the pulley A. The cogs of the ratchet-wheel e are provided with square points, as shown by the drawing, giving sufficient bearing for the spring m to hold it to its place when not in motion.

For all practical purposes, the number of counts indicated by two wheels is deemed sufficient; but if more counts are needed for any particular purpose a third wheel can be added. When the indicator is not in operation the drop d may be opened and closed without making counts by turning the stop or button n, so that drop d, when opened, shall strike against it.

I do not claim, separately, any of the parts used by me; but

What I claim as my invention is—

The pulley A, carrying ratchet-wheel f and pin k, and held in position by pawl h and spring i, in combination with cord b, passing over pulley A, and under pulley a, one end of said cord being attached to drop d, and the other end provided with a weight.

WATSON D. WILEY.

Witnesses:
ARGALUS J. HOPKINS,
RICHARD POWERS.